United States Patent [19]

Sugiyama et al.

[11] Patent Number: 4,797,824
[45] Date of Patent: Jan. 10, 1989

[54] AUTOMATIC HEADREST POSITIONING APPARATUS FOR SEAT OF MOTOR VEHICLES

[75] Inventors: Hiroshi Sugiyama, Hiratsuka; Mikio Fujiwara; Chikamasa Ikeda, both of Yokohama, all of Japan

[73] Assignee: Ikeda Bussan Co. Ltd., Kanagawa, Japan

[21] Appl. No.: 181,522

[22] Filed: Apr. 14, 1988

Related U.S. Application Data

[63] Continuation of Ser. No. 696,423, Jan. 30, 1985, abandoned.

[30] Foreign Application Priority Data

Jan. 31, 1984 [JP] Japan .................................. 59-15431

[51] Int. Cl.$^4$ .......................... G06F 15/20; B60N 1/02
[52] U.S. Cl. ................................ 364/424.05; 318/467; 296/65 R
[58] Field of Search .............................. 364/424, 425; 318/466–468; 296/64, 65 A, 65 R; 297/61, 391, 410

[56] References Cited

U.S. PATENT DOCUMENTS

| | | | |
|---|---|---|---|
| 4,204,255 | 5/1980 | Cremer | 364/425 |
| 4,222,608 | 9/1980 | Maeda | 297/391 |
| 4,285,545 | 8/1981 | Protze | 297/61 |
| 4,401,928 | 8/1983 | Kamijo et al. | 318/466 |
| 4,404,632 | 9/1983 | Harada et al. | 364/425 |
| 4,451,887 | 5/1984 | Harada et al. | 364/425 |
| 4,463,426 | 7/1984 | Caddick et al. | 364/424 |

*Primary Examiner*—Gary Chin
*Attorney, Agent, or Firm*—Foley & Lardner, Schwartz, Jeffery, Schwaab, Mack, Blumenthal & Evans

[57] ABSTRACT

An apparatus for detecting the position of a seat in a vehicle and position of eye of a sitter on the seat to thereby select an optimal position of a headrest on the basis of the detected position data. A plurality of data representing the seat position and the sitter's eye position are stored in a memory means to be read out for allowing a control means to performs arithmetic operation on the data as read out. On the basis of the result of the arithmetic operation, the positions of the headrests for a plurality of sitters can be selectively determined on the basis of the positions of the seat.

10 Claims, 3 Drawing Sheets

AUTOMATIC HEADREST POSITIONING APPARATUS FOR SEAT OF MOTOR VEHICLES

This application is a continuation of application Ser. No. 696,423, filed Jan. 30, 1985 now abandoned.

BACKGROUND OF THE INVENTION

1. Field of the Invention

The present invention relates to an automatic headrest positioning apparatus for motor vehicles. More particularly, the invention concerns an apparatus for placing headrests each disposed on a seat back of a seat at positions optimal to a plurality of sitters (i.e. driver and/or passengers) sitting on the seats of a motor vehicle which have been displaced to positions optimal to the respective sitters.

2. Description of the Prior Art

The headrest for a motor ehicle is usually supported by a headrest holder disposed on a seat back. Adjustment of the headrest in respect of height and inclination thereof is conventionally effected through manual operation of an adjusting mechanism provided in combination with the headrest holder or electrically driving the adjusting mechanism with the aid of switches.

The position of the headrest is statutorily determined so that certain safety conditions can be satisfied with the aim of protecting the sitters from being inJured upon collision or abrupt stoppage of the vehicle. However, the adjustment of the height and inclination or tilt of the headrest is in the large part performed by the sitter on the basis of his or her subjective judgment. Since the adjustment requires troublesome procedure, there arises very frequently such a situation where the headrest is not indexed to the optimal position.

Everytime a sitter is replaced by another, the position of the associated headrest has to be optimally renewed in accordance with the figure or physical frame of the latter.

Further, the driver's seat is required to be indexed to an optimal position upon exchange of the driver or in dependence on the running states of the vehicle. In that case, the position of the headrest has to be adjusted in conformance with the replacing driver and the renewed position of the seat.

SUMMARY OF THE INVENTION

An object of the present invention is to provide an automatic headrest positioning apparatus which is capable of automatically displacing the headrest to an optimal position with an improved reliability by selectively determining the optimal position in consideration of physical form or frame of the sitter or the like factor in a much facilitated manner.

Another object of the present invention is to provide an automatic headrest positioning apparatus which is capable of displacing the seat to a position optimal to the sitter and additionally capable of displacing the headrest to an optimal position corresponding to the displacement of the seat.

Still another object of the present invention is to provide an automatic headrest positioning apparatus which is capable of displacing the headrest to the optimal position in following the displacement of the seat made arbitrarily by the sitter.

In view of the above objects, there is provided according to a general aspect of the invention an automatic headrest positioning apparatus for displacing optimally the headrest provided for a seat in a vehicle which can be displaced or adjusted with respect to the position of a seat cushion and the angle of inclination of a seat back.

In the seat for the vehicle, the height as well as the forward/rearward position (i.e. position in the horizontal direction) of the seat cushion and the angle of inclination of the seat back are adapted to be adjusted through seat displacing means constituted by drive motors, link mechanism and the like under the control of seat position control means constituted by a microcomputer or the like.

The seat position control means reads out selected seat position data from memory means storing the seat position data corresponding to a number of the sitters, through selective operation of switches grouped in an array, for thereby driving the seat displacing means.

The seat position data represents the positions of the seat cushions and the seat backs optimal for the sitters, respectively. These seat position data can be prepared by firstly placing the seat cushion and the seat back at respective reference positions, allowing subsequently the sitters to drive individually the associated seat displacing means through operation of the switches for thereby displacing the seat cushions and the seat backs to the positions optimal to the sitters, respectively, and storing the displacements of the seat-cushions and the seat-backs in the memory means.

The automatic headrest positioning apparatus further includes means for detecting the position of eye of the sitter. This the eye position detecting means may be composed of a light beam emitting device which is so arranged that the sitter's eye position can be detected upon visual recognition of a light beam projected by the light beam device. For example, when a sitter visually recognizes one of light beams of different colors emitted by the light beam device, said one light beam is selected to be utilized for determination of the sitter's eye position. Alternatively, a single light beam is employed and deflected by a mirror or the like whose angle is so adjusted that the light beam can be visually recognized by the sitter, wherein the angle of the mirror can provide the data for determining the sitter's eye position.

The headrest is adapted to be displaced or changed in respect to the height and the inclination thereof through headrest displacing means composed of drive motors, link mechanism and the like under the control of headrest position control device which may be constituted by a microcomputer and the like.

The automatic headrest position adjusting device is so arranged that when a seat is displaced in accordance with the selected seat position data, the headrest position control means performs arithmetic operation on the selected seat position data and the sitter's eye position data detected at that seat position, to thereby determine the optimal headrest position corresponding to the sitter in concern and the instant seat position, whereby the headrest is displaced to the optimal position by driving correspondingly the headrest displacing means.

Above and other objects, features and advantages of the present invention will be more apparent upon consideration of the following description taken in conjunction with the accompanying drawings.

DESCRIPTION OF THE PREFERRED EMBODIMENTS

Figure 1:
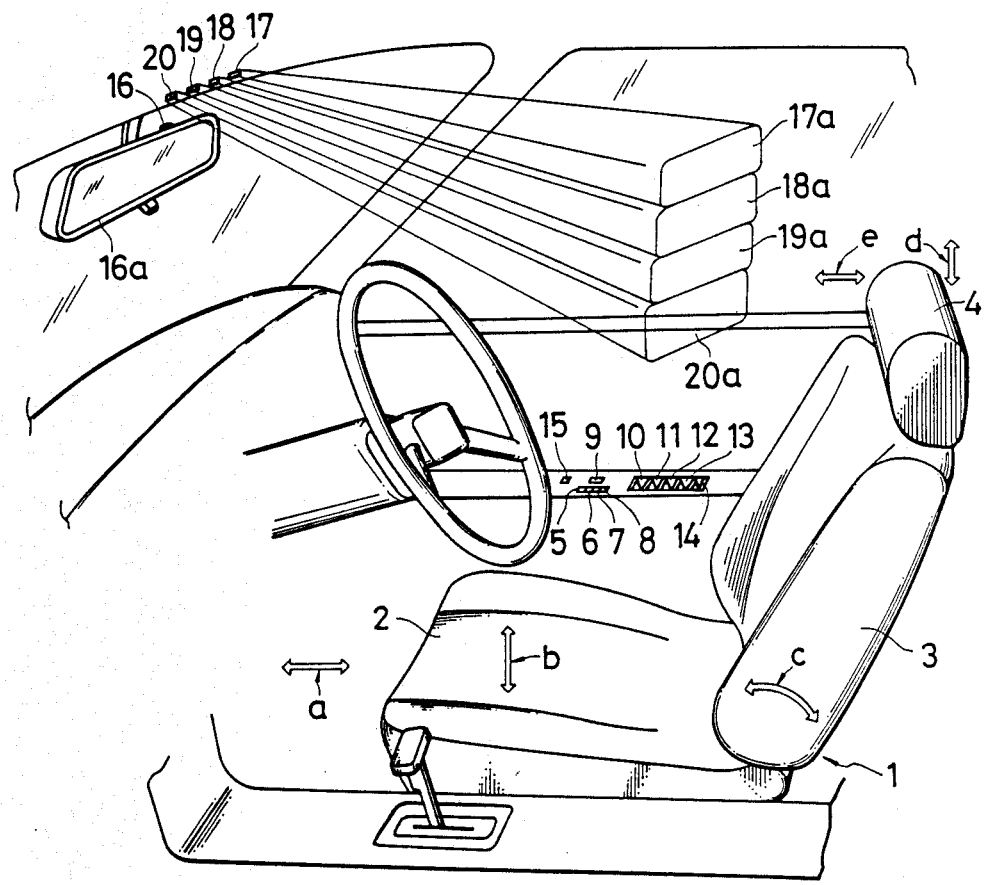
FIG. 1 is a schematic perspective view showing a chamber of a vehicle to which an apparatus according to an exemplary embodiment of the present invention is applied.

FIG. 1 is a schematic perspective view showing a driver's compartment of a motor vehicle such as an automobile which is provided with an automatic headrest positioning apparatus according to an exemplary embodiment of the present invention.

Referring to FIG. 1, a seat installed on the vehicle and generally denoted by a reference numeral 1 is of such a structure in which a seat cushion 2 can be selectively displaced forwardly or backwardly in the horizontal direction and up or down in the vertical direction while a seat back 3 can be selectively inclined forwardly or rearwardly so that the sitter may occupy the optical or most confortable position in conformance with the physical features or the like factors of the sitter.

There is disposed on the top of the seat back 3 a headrest 4 which is also adapted to be manipulated so that it can be displaced up or down in the vertical direction as well as in the forward or rearward direction, to be located at the optimum position.

Provided at an arm rest portion of a door located on a lateral side of the driver's seat are a group of switches which serve for setting the seat cushion 2, the seat back 3 and the headrest 4 associated with the driver at the respective optimum positions. More specifically, the group of switches provided in the case of the illustrated embodiment may include four designating switches 5, 6, 7 and 8 which can afford designation of up to four types of (or four different) sitters per one seat, manually operated switches 10, 11, 12, 13 and 14 for selectively displacing or positioning the seat cushion 2, seat back 3 and headrest 4 mentioned above, and a writing or loading switch 15 for allowing the data of positions of the seat cushion 2, the seat back 3 and the headrest 4 to be loaded or written in a memory or storage 42 provided in association with a microprocessor or microcomputer 40 which will be described below by referring to FIG. 2.

Figure 2:
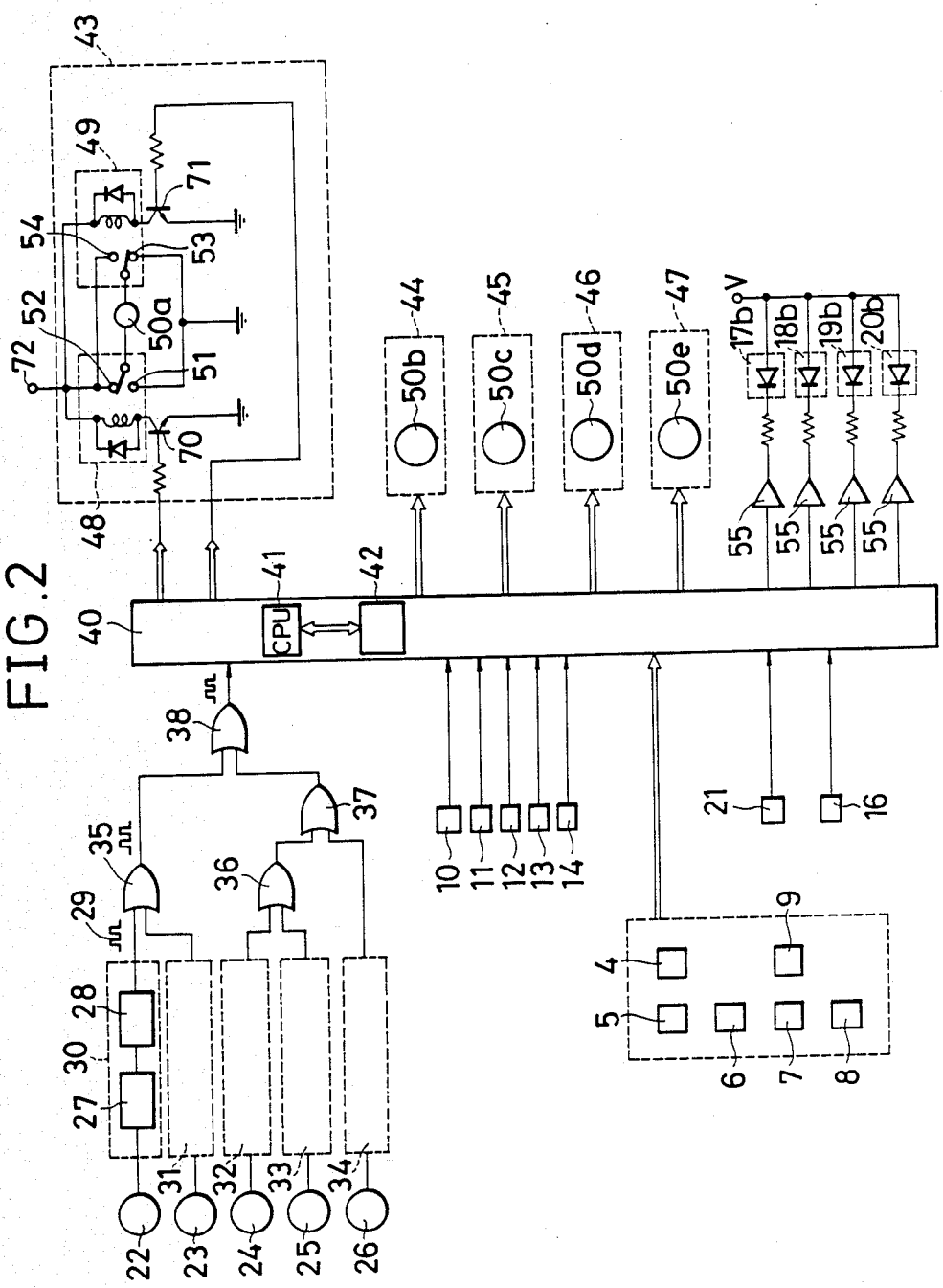
FIG. 2 is a circuit diagram of the apparatus shown in FIG. 1.

Now, referring to FIG. 2, there is shown a control circuit for controlling the positioning of the seat cushion 2, the seat back 3 and the headrest 4 according to an exemplary embodiment of the present invention.

In the figure, a reference numeral 50a denotes a seat cushion vertical drive motor for displacing the seat cushion 2 in the vertical direction, i.e. up or down, as indicated by an arrow b. On the other hand, a reference symbol 50b denotes a seat cushion horizontal drive motor for displacing the seat cushion 2 in the horizontal direction, i.e. forwardly or rearwardly, as indicated by an arrow a. The vertical drive motor 50a is adapted to be activated by means of the manually operatable up/down switch 10 belonging to the switch group mentioned hereinbefore. On the other hand, the horizontal drive motor 50b for displacing the seat cushion 2 in the horizontal direction is adapted to be controlled by the manually operatable forward/rearward switch 11 also constituting a part of the aforementioned switch group.

The seat back 3 is also adapted to be inclined forwardly or rearwardly, as indicated by an arrow c, by means of a seat-back drive motor 50c which is operated under the control of the associated manual switch 12 of the aforementioned switch group.

Finally, the headrest 4 is caused to move up or down by a headrest up/down drive motor 50d, as indicated by an arrow d, while the forward or rearward displacement of the headrest 4 indicated by an arrow e is brought about by a headrest forward/rearward drive motor 50e. The headrest up/down drive motor 50d is put under the command of the manually operable headrest up/down switch 13 while the headrest forward/rearward drive motor 50e is under the control of the manually operable headrest forward/rearward switch 14.

Next, description will be made on driving circuits 43, 44, 45, 46 and 47 for the drive motors 50a, 50b, 50c, 50d and 50e, respectively. Each of the manually operable switches 10, 11, 12, 13 and 14 mentioned above includes a forward contact for causing the associated drive motor to be rotated in a forward direction and a reversing contact causing the associated motor to run in the rev,erse direction opposite to the forward direction. By manually changing over the switch between the forward contact and the reversing contact, the associated motor 50a, 50b, 50c, 50d or 50e is driven in the forward direction or in the reversed direction. By way of example, it is assumed that the seat cushion up/down switch 10 is changed over to the forward position. Then, a forward rotation signal of ON or high level is supplied to the microcomputer 40, as a result of which a transistor 70 of the driving circuit 43 is turned on, allowing a current to flow through an exciting coil of a relay circuit 48, which in turn results in the changing-over of the relay switch to a contact 52 connected to a power supply source 72 from a contact 51. On the other hand, a transistor 71 of the driving circuit 43 is turned off. Consequently, no current flows through an exciting coil of a relay circuit 49, resulting in that the relay switch is changed over to a contact 53 connected to the ground. On these conditions, the current flows through the drive motor 50a by way of the contact 52 toward the ground, whereby the drive motor 50a is rotated in the forward direction.

It is next assumed that the manually operable seat cushion up/down switch 10 is changed over to the reversing contact or position. Then, a rotation reversing signal of ON or high level is supplied to the microcomputer 40, resulting in that the transistor 71 of the driving circuit 43 is turned on. As the consequence, the relay switch is changed over from the contact 53 to the contact 54 electrically connected to the power supply source 72, while the transistor 70 is turned off with the contact 52 being exchanged by the contact 51. On these conditions, the current flows from the power supply source 72 through the path constituted by the contact 54, the drive motor 50a and the contact 51 to the ground, whereby the drive motor 50a is rotated in the reversed or backward direction.

In this manner, the seat cushion up/down drive motor 50a can be driven in the forward or backward (i.e. reversed) direction by correspondingly manipulating the seat cushion up/down switch 10.

The driving circuits 44, 45, 46 and 47 for other drive motors 50b, 50c, 50d and 50e are also realized in the same configuration as the driving circuit 43 described above. In other words, each of these drive motors can be driven in the forward or backward (reversed) direction by manipulating correspondingly the associated manual switches 11, 12, 13 and 14, respectively.

It should be noted that each of the drive motors 50a, 50b, 50c, 50d and 50e is provided with sensors 22, 23, 24, 25 and 26, respectively, each of which may be constituted, for example, by a pulse encoder for sensing or detecting the amount of rotation of the associated drive motor. More specifically, the sensor 22 is installed in association with the drive motor 50, the sensor 23 is associated with the drive motor 50b, the sensor 25 is associated with the drive motor 50d, and the sensor 26 is associated with the drive motor 50e. The output signals of these sensors representative of amounts of rotations of the associated drive motors are, respectively, applied to associated pulse-signal shaper circuits 30, 31, 32 and 34, the output signals of which in turn are supplied to a central processing unit (also referred to as the central arithmetic unit) 41 incorporated in the microcomputer 40. Next, description will be made on the pulse shaper circuits 30, 31, 32, 33 and 34 provided in the illustrated embodiment of the invention. The pulse shaper circuit, say 30, may be constituted by a Schmit trigger 27 and a mono-stable multivibrator 28, by way of example, in such an arrangement that upon generation of the voltage signal output from the sensor 22 in the course of rotation of the seat cushion up/down drive motor 50a, a pulse waveform signal 29 is produced by the shaper circuit 30.

Of course, the other pulse waveform shaping circuits 31, 32, 33 and 34 may be realized in the same configuration as the pulse shaper circuit 30 described above.

Here, it is assumed that the seat-cushion up/down drive motor 50a is being rotated while the other motors, i.e. the seat-cushion forward/rearward drive motor 50b, the seat-back drive motor 50c, the headrest up/down drive motor 50d, and the headrest forward/rearward drive motor 50e are in the stationary state. In this assumed state, only the pulse shaping circuit 30 produces at its output the pulse waveform signal 29, while the output signals of the other pulse shaping circuits 31, 32, 33 and 34 are all at OFF or low level. Consequently, only the pulse waveform signal 29 produced by the shaper 30 is inputted to an OR gate 38 through an OR gate 35. Since the output signals of the pulse shaping circuits 32, 33 and 34 are at low level, the outputs of OR gates 36 and 37 are at low level. Consequently, the OR gate 38 produces as the output thereof the pulse signal of the waveform corresponding to that of the pulse waveform signal 29 produced by the pulse shaper circuit 30. This signal gated through the OR gate 38 is supplied to the input of the microcomputer 40 as a pulse count signal.

The central processing or arithmetic unit 41 incorporated in the microcomputer 40 arithmetically determines the amount of rotation of the seat cushion up-/down drive motor 50a through addition or subtraction of the pulse count input signal in dependence on the instantaneous position of the manually operable seat cushion up/down switch 10, to thereby calculate the displacement or magnitude of movement (displacement) of the seat cushion 2 in the up- or down-direction on the basis of the determined amount of rotation of the motor 50a.

Also in the cases where the other drive motors 50b, 50c, 50d and/or 50e is driven by manipulating the associated manual switches 11, 12, 13 and/or 14, the amount of rotation of the drive motor(s) is determined in the same manner as in the case of the drive motor 50a described above, to thereby calculate the displacement(s) of the seat cushion 2, the seat back 3 and/or the headrest 4 in the relevant direction(s).

In the automatic headrest positioning apparatus for the headrest 4 according to the illustrated embodiment, means for detecting the position of the eye of the driver or passenger (i.e. sitter) is provided with the aim of detecting the seating state or posture of the passenger. As will be seen in FIG. 2, this eye position detecting means is composed of a light beam device including four light emission diodes (LEDs) 17b, 18b, 19b and 20b and a selecting switch 16 for selecting one of the four light beams 17a, 18a, 19a and 20a emitted by the LEDs. By the way, reference numeral 55 in FIG. 2 denotes buffer amplifiers.

As is shown in FIG. 1, the light beam device is so arranged and disposed that the light beams 17a, 18a, 19a and 20a are produced through four light beam projecting apertures 17, 18, 19 and 20 which are disposed on the ceiling wall of the vehicle at a front portion of the vehicle chamber. The individual light beams are of mutually different colors and are projected in the vicinity of the sitter's face in a stepwise stacked pattern. The illustrated beam device may be so implemented that the individual light beams 17a, 18a, 19a and 20a may be sequentially emitted each at an interval of 1 second, for example, on the time division basis.

It should be mentioned that the selecting switch 16 is mounted on an inner mirror 16a.

With the eye position detecting means, when one of the light beam 17a, 18a, 19a and 20a falls on the sitter's eyes in dependence on the position of eyes of the driver sitting on the seat, he or she operates the selecting switch 16. More specifically, upon irradiation of the sitter's eyes with one of the light beams, that one light beam is detected by the microcomputer 40 in response to the operation .fo the selecting switch 16, whereby the light beam falling on eyes of the driver or passenger sitting on the seat is selectively identified.

On the other hand, the central arithmetic processing unit 41 performs predetermined arithmetic operations on the basis of the seat position data representative of the positions of the seat cushion 2 and the seat back 3 and the light beam data representative of the result of selection of one of the light beams 17a, 18a, 19a and 20a, to thereby determine the optimal position of the headrest 4.

In the case of the illustrated embodiment, a number of combinations of the positions of the cushion 2 and the seat back 3 on one hand and the selection of the light beams, i.e. combinations of the seat position data and the light beam data are previously estimated, wherein the optimal positions of the headrest 4 corresponding to the combinations are also previously determined and stored in the memory 42 of the microcomputer 40.

Figure 3:
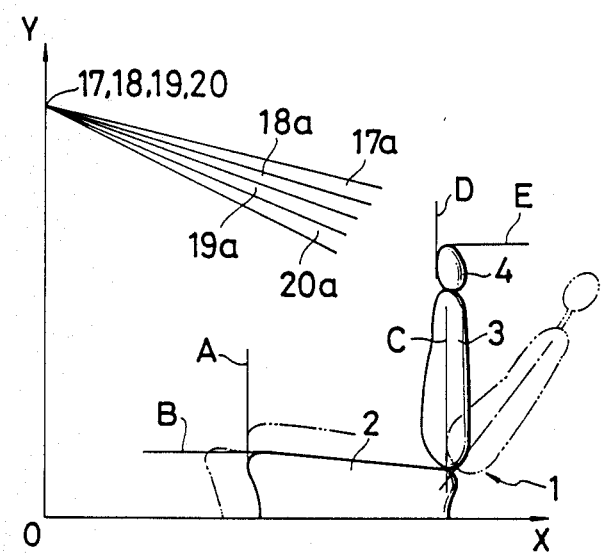
FIG. 3 is a side view for illustrating reference positions and displacements of a seat in the vehicle.

Next, a procedure for obtaining or preparing the seat position data and the light beam data will be described by also referring to FIG. 3.

For obtaining these data, reference positions of the seat cushion 2 and the seat back 3 are first set or established. This setting can be accomplished by operating a reference position writing or loading switch 21 (FIG. 2) in the state in which the seat cushion 2, the seat back 3 and the headrest 4 are set at the respective reference positions. To this end, the seat cushion 1 may be moved, for example, to the rearmost position A and to the bottom position B with the seat back 3 being tilted most forwardly to the position C while the headrest is displaced to the rearmost position D and the bottom position E, as illustrated in FIG. 3, by correspondingly operating the manual switches 10, 11, 12, 13 and 14. On these conditions, the writing or loading switch 21 mentioned above is operated, as the result of which the reference position data representing the positions A, B, C and D, respectively, are stored in the memory 42 of the microcomputer 40, whereby the X-Y coordinates including the origin O which serve as the references for the seat position data and the light beam data are determined.

Now, the seat cushion 2, the seat back 3 are displaced by means of the drive motors 50a, 50b and 50c, during which the numbers of the pulses produced by the associated sensors 22, 23 and 24, respectively, are counted by the central arithmetic unit 41, which then arithmetically determines the displacements of the seat cushion 2 and the seat back 3 on the basis of the reference position data to thereby make available the seat position data mentioned above.

The central arithmetic unit 41 further determines the coordinate positions of the light beam projecting apertures 17, 18, 19 and 20 as well as the angles of inclination of the individual light beams 17a, 18a, 19a and 20a, to thereby prepare a quadruple of light beam data which are then stored in the memory 42.

In the case of the automatic headrest positioning apparatus according to the instant embodiment of the invention, the seat cushion 2 is displaced stepwise, for example, by several centimeters in the vertical and horizontal directions, while the tilt angle of the seat back 3 is varied stepwise by several degrees upon each displacement of the seat cushion 2, wherein the seat position data obtained at each displacement are supplied to the central arithmetic unit 41. The latter then reads out from the memory 42 the quadruple of the light beam data sequentially and performs arithmetic operation for selecting the optimal position of the headrest 4 from the data combinations described hereinbefore on the basis of the light beam data and the seat position data supplied to the arithmetic unit 41. In accordance with the result of the arithmetic operations, the optimal position of the headrest 4 is determined, whereby the seat position data indicative of the optimal positions of the headrest 4 are sequentially supplied to the memory 42 to be stored therein together with the data representative of the results of the arithmetic operations from the central arithmetic unit 41.

The headrest position data stored in the memory 42 in this manner can be read out by the central arithmetic unit 41 as occasion requires. On the basis of the headrest position data, the headrest 4 is moved to the optimal position through cooperation of the headrest up/down drive motor 50d and the headrest forward/rearward drive motor 50e.

On the other hand, the optimal positions of the seat cushion 2 and the seat back 3 corresponding to the driver or passenger sitting on the.seat can be loaded in the memory 42 by the loading operations performed by the sitter himself. More specifically, the sitter places the seat cushion 2 and the seat back 3 at the respective optimal positions through operation of the manual switches 10, 11 and 12. Subsequently, the position data loading switch 15 and one of the designating switches 5, 6, 7 and 8 are actuated. The designating switches 5, 6, 7 and 8 are provided for accomodating designation of up to four types of sitters per one seat. In more concrete, the designating switch 5 is provided for a first sitter, the switch 6 is for a second sitter, the switch 7 is for a third sitter, and the switch 8 is provided for a fourth sitter. Assuming that the first sitter sets the seat cushion 2 and the seat back 3 at the respective optimal positions, he or she is then reqired to operate the loading switch 15 and subsequently the designating swith 5. Then, the central arithmetic unit 41 arithmetically determines the displacements of the optimally positioned seat cushion 2 and seat back 3 from the reference positions thereof, the results of the arithmetic operation being stored as the seat position data in the memory 42 at the address corresponding to the designating switch 5.

Similarly, the second, third and/or fourth different sitters can store the position data representing the respective optimal positions of the seat cushion 2 and the seat back 3 in the memory 42 at the address corresponding to the designation switch 6, 7 and/or 8.

The seat position data stored in this manner can be read out from the memory 42 by the arithmetic unit 41 through operation of one of the designating switches 5, 6, 7 and 8. The corresponding seat cushion 2 and seat back 3 can be automatically displaced by the associated drive motors 50a, 50b and 50c on the basis of the seat position data read out from the memory 42. Accordingly, each sitter can automatically set his or her seat 1 at the optimal position by selectively operating the allocated designating switch.

On the other hand, the headrest 4 can be automatically indexed to the optimal position under the control of the central arithmetic or processing unit 41 when the passenger or driver sitting on the seat 1 selects one of the light beams 17a, 18a, 19a and 20a. More specifically, the central processing unit 41 performs arithmetic operation on the basis of the data of the selected light beam and the optimal seat position data for selecting and reading out the headrest position data from memory 42 in accordance with the result of the arithmetic operation, whereupon the headrest up/down drive motor 50d and the headrest forward/backward drive motor 50e are driven on the basis of the headrest position data to thereby move the headrest 4 to the optimal position as selected.

It should be mentioned that the automatically set position of headrest 4 can be additionally fine adjusted with the aid of the headrest up/down manual switch 13 and the headrest forward/rearward manual switch 14.

The optimal position of the seat 1 set by the sitter can be reset by operating a stop switch 9 which belongs to the switch group or array described hereinbefore so that the seat 1 can be renewedly positioned optimally for other sitter. Further, this stop switch 9 serves for interrupting the data write/read operations triggered by the passenger as well as operations of the motors and the emission of the light beams.

When the seat 1 once indexed to the optimal position is again displaced through operation of the sitting passenger, the central arithmetic unit 41 calculates the displacement of the headrest 4 conforming to that of the seat 1, to thereby index the headrest 4 at a renewed optimal position.

Next, operations of the automatic headrest positioning apparatus of the structure described above will be elucidated in more detail in conjunction with the illustrated embodiment.

Figure 4:
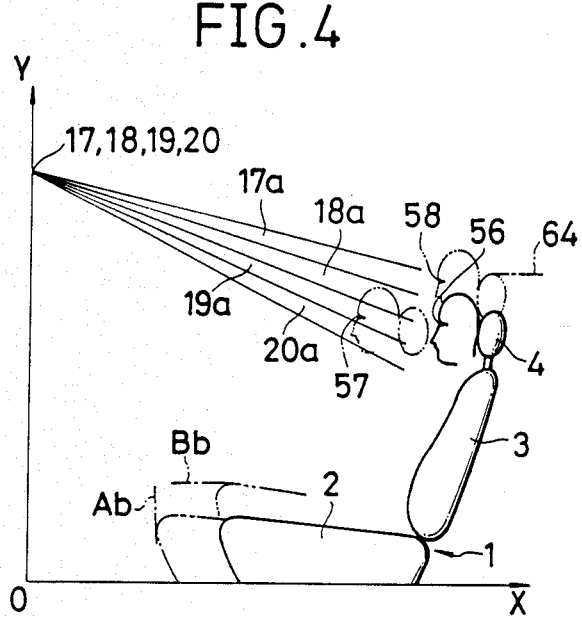
FIG. 4 is a side view for illustrating displacement of a headrest for displacement of a seat-cushion.

FIG. 4 shows an exemplary case in which the position of the headrest 4 is to be varied through selection of the light beams. It is assumed that the headrest 4 has been previously indexed at an optimal position conforming to the initial seat position.

On the assumption, when the seat cushion 2 is displaced to a position Ab through operation by the sitter, i.e. driver or passenger, the sitter's eye changes its position from 56 to 57, resulting in that the light beam to be selected is changed over to the light beam 19a from the light beam 18a. In this case, the height of eye in the Y-direction remains unchanged independent of the forward movement of the seat 1. In other words, the vertical position of the head of the sitter remains unchanged. Thus, the central arithmetic unit 41 performs operation on the light beam data and the seat position data to determine that the position of the sitter's head relative to the seat back 3 is not changed, to thereby inhibit the renewal of the headrest position.

When the seat cushion 2 is raised to a position Bb, the sitter's eye position elevates from 56 to 58, resulting in that the light beam 17a falls on the sitter's eye in place of the initially recognized light beam 18a. Accordingly, the central arithmetic unit 41 performs arithmetic operation on the light beam data and the seat position data to thereby cause the headrest 4 to be moved to a height level 64 which is optimal to the sitter.

Figure 5:
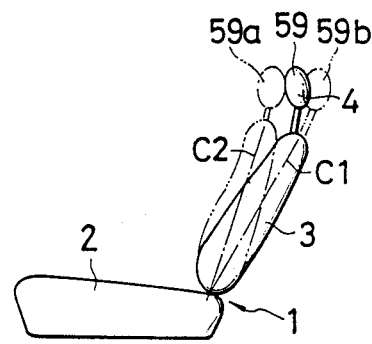
FIG. 5 is a side view for illustrating displacement of the headrest for displacement of a seat-back.

FIG. 5 illustrates an exemplary case in which the position of the headrest 4 is displaced without resorting to the selection of the light beams. Referring to the figure, it is assumed that the seat back 3 is set at an inclined position C2 which is suitable for the driving at a low or intermediate speed. At that time, the headrest 4 is set at a position 59a. When the seat back 3 is displaced from the position C2 to a position C1 as the attitude or posture of the sitter changes due to the transition to a high-speed running of the vehicle, the arithmetic unit 41 arithmetically determines magnitude of the inclination of the seat back to thereby cause the headrest 4 to advance from the position 59b to a position 59 which is optimal to the sitter in the instant running state.

As will be appreciated from the foregoing description, the headrest positioning apparatus according to the illustrated embodiment of the invention is capable of automatically indexing the headrest 4 to the optimal position on the basis of the result of arithmetic operation performed by the central arithmetic unit 41 on both the light beam data and the seat position data or on the seat position data alone.

In the foregoing description, it has been assumed that the eye position detecting means is so constructed as to select one of the light beams 17a, 18a, 19a and 20a. However, it will be appreciated that such a structure may also be adopted in which the projecting angle of a single light beam is regulated by adjusting a deflecting mirror or the like, whose angle of inclination is detected by means of a potentiometer or the like to be supplied to the central arithmetic unit as the data for determining the angle of the light beam, to thereby detect the sitter's eye position.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An automatic headrest positioning apparatus, comprising:
    a headrest provided on a seat which can be displaced by seat displacing means, said headrest being displaceable by headrest displacing means;
    seat position detecting means for detecting the position of said seat;
    eye position detecting means including light beam projecting means for detecting the position of the eye of a sitter on said seat;
    memory means for storing seat position data obtained through said seat position detecting means and detected eye position data obtained through said eye position detecting means; and
    control means for performing arithmetic operation on selected seat position data and the detected eye position data read out from said memory means to thereby cause said headrest to be displaced to an optimal position by driving the headrest displacing means on the basis of the result of said arithmetic operation.

2. An automatic headrest positioning apparatus according to claim 1, wherein said seat displacing means is composed of a seat-cushion displacing means for displacing selectively a seat cushion in vertical and horizontal directions and a seat-back displacing means for tilting selectively a seat back in forward and rearward directions.

3. An automatic headrest positioning apparatus according to claim 1, wherein the seat position data corresponding to a plurality of sitters are stored in said memory means at predetermined addresses through manipulation of switches constituting a switch array, said control means reading out selectively the seat position data corresponding to one sitter through selective manipulation of said switch array, to thereby drive said seat displacing means for displacing said seat to a corresponding position.

4. An automatic headrest positioning apparatus according to claim 1, wherein said memory means stores therein headrest position data corresponding to the detected eye position data and the seat position data, said control means selecting the headrest position data on the basis of the result of said arithmetic operation to thereby drive said headrest displacing means so that said headrest is displaced to an optimal position.

5. An automatic headrest positioning apparatus according to claim 1, wherein said memory means and said control means is constituted by a microcomputer.

6. An automatic headrest positioning apparatus, comprising:
    a headrest provided on a seat which can be displaced by seat displacing means, said headrest being displaceable by headrest displacing means;
    seat position detecting means for detecting the displacements of a seat cushion in up-down and in forward-rearward directions, and an inclination of a seat back;
    eye position detecting means including light beam projecting means which project a plurality of different colors of light beam for detecitng the position of the eye of a sitter on said seat;
    memory means for storing seat position data obtained through said seat position detecting means and detected eye position data obtained through said eye position detecting means; and
    control means for performing arithmetic operation on the selected seat position data and the detected eye position data read out from said memory means to thereby cause said headrest to be displaced to an optimal position by driving the headrest displacing means on the basis of the result of said arithmetic operation.

7. An automatic headrest positioning apparatus according to claim 6, wherein said seat displacing means comprises of a seat-cushion displacing means for selectively displacing a seat cushion in vertical and horizontal directions and a seat-back displacing means for selectively tilting a seat back in forward and rearward directions.

8. An automatic headrest positioning apparatus according to claim 6, wherein the seat position data corresponding to a plurality of occupants are stored in said memory means at predetermined addresses through manipulation of switches comprising a switch array, said control means reading out selectively the seat position data corresponding to one occupant through selective manipulation of said switch array, to thereby drive said seat displacing means for displacing said seat to a corresponding position.

9. An automatic headrest positioning apparatus according to claim 6, wherein said memory means stores therein headrest position data corresponding to the detected eye position data and the seat position data, said control means selecting the headrest position data on the basis of the result of said arithmetic operation to thereby drive said headrest displacing means so that said headrest is displaced to an optimal position.

10. An automatic headrest positioning apparatus according to claim 6, wherein said memory means and said control means comprises a microcomputer.

* * * * *